United States Patent Office

2,694,723
Patented Nov. 16, 1954

2,694,723

XANTHOGENATO-SULFONATES AND PROCESS FOR THE PREPARATION OF MERCAPTO-ALKANESULFONATES

Charles H. Schramm, Hillsdale, N. J., assignor to Lever Brothers Company, New York, N. Y., a corporation of Maine No Drawing. Application September 27, 1952, Serial No. 311,957

8 Claims. (Cl. 260—455)

This invention relates to a novel process for the preparation of mercaptoalkanesulfonic acids and their salts.

Generally speaking, the process of the present invention may be performed in accordance with the following sequence of reactions:

(1)   XRX   +   $Me_2SO_3$   ⟶   $XRSO_3Me$  +  MeX
  Di-halo-      Metal            Haloalkane-
  alkane        sulfite          sulfonate (2)  $XRSO_3Me$  +  $R_1OCSSMe$  ⟶  $R_1OCSSRSO_3Me$  +  MeX
  Haloalkane-      Alkyl              Alkylxanthogenato-
  sulfonate        xanthate           alkane sulfonate (3)
$R_1OCSSRSO_3Me$  +  $NH_4OH$  ⟶  $HSRSO_3Me$  +  $R_1OCSNH_2$
Alkylxanthogenato-                    Mercaptoalkane-
alkanesulfonate                       sulfonate (4)  $HSRSO_3Me$  +  H+ (ion exchange)  ⟶  $HSRSO_3H$
  Mercaptoalkane                              Mercaptoalkane-
  sulfonate                                   sulfonic acid (5)    $HSRSO_3H$    +    MOH    ⟶    $HSRSO_3M$
  Mercaptoalkane       Base          Mercaptoalkane-
  Sulfonic acid                      sulfonate in which X is halogen, preferably bromine or chlorine; R is an alkylene group having 1 to 5 carbon atoms, preferably 2; Me is a metal, preferably an alkali metal such as sodium or potassium; $R_1$ is an alkyl group having 1 to 5 carbon atoms, preferably 2, and M is a cation which forms a soluble mercaptoalkane sulfonate such as ammonium, sodium, ethanolammonium, etc.

Any water-soluble sulfite may be employed in Reaction 1 in place of the metal sulfite shown above, but due to economic considerations, sodium or potassium sulfite is usually employed. The water-soluble metal metabisulfites, such as sodium metabisulfite, may also be used in place of the sulfite in Reaction 1. However, in the latter cases, it is necessary to add 1 mol of the metal hydroxide, such as sodium hydroxide, per mole of metabisulfite. It has been found advisable not to add the sulfite in greater than stoichiometric quantities to the Reaction 1 since the presence of excess sulfite favors the formation of undesirable disulfonates.

Reaction 1 has been described in the literature in an article by I. M. Lipovich, J. Applied Chem. (USSR) 18, 718–24 (1945); Chem. Abs. 40, 6407 (1946). In this experiment, the investigator purified a bromoethanesulfonate compound and converted it with sodium hydrogen sulfide (NaSH) to the sodium 2-mercaptoethanesulfonate. In an example employing the haloethanesulfonate in accordance with the present invention, sodium hydrogen sulfide is not employed, but instead the haloethane sulfonate salt, which may be the sodium salt, is reacted with an alkyl xanthate.

By reacting sodium haloalkanesulfonate with an alkali metal alkyl xanthate, such as sodium ethyl xanthate, as in Reaction 2 above, sodium alkylxanthogenatoalkanesulfonate is formed. This reaction is carried out by mixing a solution of the two reactants in any inert reaction medium such as water at a temperature of from 65° F. to 75° F. for a period between about 2 and 4 hours and cooling the solution below this temperature to permit the crystalline precipitate of the sodium salt of alkyl β-xanthogenatoethanesulfonic acid to deposit from the solution. The sodium salt of alkyl β-xanthogenatoethane-sulfonic acid is then reacted with a base such as ammonium hydroxide, as in Reaction 3 above. The temperature of the reaction may be from about 65° F. to about 75° F. The reaction requires about 24 to 48 hours for completion.

Further, any other organic nitrogen base possessing a labile hydrogen ion may be used in Reaction 3 above instead of ammonium hydroxide, such as methylamine, dimethylamine, ethylamine, and butylamine. The ammonium hydroxide, or other base, is usually employed in a solution in ethyl alcohol.

The mercaptoalkanesulfonate product of Reaction 3 above may be converted to the free sulfonic acid by means of a cation exchange resin treatment in which a solution of mercaptoalkanesulfonate in an inert solvent such as water is passed through a cation exchange resin whereby the alkali metal ion is replaced by a hydrogen ion to form mercaptoalkanesulfonic acid in accordance with Reaction 4 above.

Any cation exchange resin possessing strongly acid groups is satisfactory for use in converting the mercapto-alkanesulfonate salt into the corresponding sulfonic acid. Examples of suitable cation exchange resin materials are the nuclear sulfonic type cation resins such as commercial Amberlite IR–120, Amberlite IR–100, and Dowex-50.

The mercaptoalkanesulfonic acid obtained is extremely pure, which is an important consideration since the oxidation of mercaptans is catalyzed by the presence of small amounts of impurities. The acid can be used directly in the preparation of derivatives of the sulfonic acid. For example, the sulfonic acid may be reacted with various basic compounds to form the corresponding salts according to Reaction 5. For example, β-mercaptoethanesulfonic acid can be reacted with monoethanolamine in an addition reaction to prepare monoethanolamine β-mercaptoethanolaminesulfonate as follows:

$HSCH_2CH_2SO_3H + H_2NCH_2CH_2OH \rightarrow$
$HSCH_2CH_2SO_3NH_3CH_2CH_2OH$

In a similar addition reaction β-mercaptoethanesulfonic acid can be reacted with any other amine, such as ethylamine to form the corresponding ethylamine β-mercaptoethanesulfonate as follows:

$HSCH_2CH_2SO_3H + CH_3CH_2NH_2 \rightarrow$
$HSCH_2CH_2SO_3NH_3CH_2CH_3$

The mercaptoalkanesulfonic acids can also be reacted with mineral bases to form corresponding salts of the sulfonic acid by a substitution reaction. One example thereof is the reaction of an alkali metal hydroxide, such as sodium hydroxide with β-mercaptoethanesulfonic acid to prepare sodium β-mercaptoethanesulfonate as follows:

$HSCH_2CH_2SO_3H + NaOH \rightarrow HSCH_2CH_2SO_3Na + H_2O$

Similarly ammonium hydroxide can be reacted with β-mercaptoethanesulfonic acid to prepare ammonium β-mercaptoethanesulfonate by the following reaction:

$HSCH_2CH_2SO_3H + NH_4OH \rightarrow HSCH_2CH_2SO_3NH_4 + H_2O$

In all of the above reactions the mercaptoethanesulfonic acid is employed as illustrative. The other mercaptoalkanesulfonic acids described herein may also be prepared similarly together with their derivatives above described.

It will be appreciated also that salts of the alkanesulfonic acids can be prepared directly from the mercaptoalkanesulfonates by passing these latter compounds through cation exchange resins possessing some other labile cation group in place of the reactive hydrogen ion previously described.

The invention will be further illustrated by reference to the following specific examples:

Example 1

*Step 1.—Sodium β-bromoethanesulfonate.*—A 12-liter, 3-necked flask was filled with 2460 grams of ethylene dibromide, 5000 cc. of 95% ethyl alcohol and 1800 cc. of water. The mixture was heated to a vigorous reflux and while being stirred, there was added a solution of 500 grams of sodium sulfite in 1800 cc. of water over a period of 3 hours. The refluxing was continued until the reaction was substantially complete. At the end of this time, the mixture was distilled until 5 liters of solution had been distilled. Fifteen hundred grams of ethylene dibromide were recovered from the distillate. The residual solution was poured into large evaporating dishes and taken to dryness on a steam bath. From this there was obtained 1182 grams of white crystalline sodium β-bromoethanesulfonate containing 32.8% sodium bromide.

*Step I–A.—Potassium β-chloroethanesulfonate.*—The procedure of step I was repeated except that an equimolar quantity of ethylene dichloride, instead of ethylene dibromide, was reacted with potassium sulfite.

*Step II.—Sodium salt of ethyl β-xanthogenatoethanesulfonic acid.*—A saturated solution containing 167 grams of sodium bromoethanesulfonate was reacted at room temperature with a saturated solution of 311 grams of potassium ethylxanthate in water for 2 hours. The sodium salt of the ethyl β-xanthogenatoethanesulfonic acid crystallized from the reaction mixture in the form of large plates. The yield was 160 grams.

*Step II–A.—Sodium salt of ethyl β-xanthogenatoethanesulfonic acid.*—The procedure of step II was repeated except that an equimolar quantity of sodium ethylxanthate, instead of potassium ethylxanthate, was reacted with sodium bromoethanesulfonate.

*Step II–B.—Sodium salt of butyl β-xanthogenatoethanesulfonic acid.*—A saturated solution containing 200 grams of sodium bromoethanesulfonate was reacted at room temperature with a saturated solution of 400 grams of sodium butylxanthate in water for 3 hours. The sodium salt of the butyl β-xanthogenatoethanesulfonic acid crystallized from the reaction mixture in the form of large plates. The yield was 230 grams.

*Step III.—Sodium β-mercaptoethanesulfonate.*—The xanthate compound from step II was dissolved in a mixture of 1 liter of 95% ethyl alcohol and 1 liter of concentrated ammonium hydroxide. After standing for 48 hours at room temperature, the reaction mixture was evaporated to dryness in vacuo. The dry residue was extracted with 500 cc. of a mixture of 30% ethyl alcohol and 70% ethyl ether to remove ethylxanthamidate. The yield of product was 53 grams.

*Step III–A.—Sodium β-mercaptoethanesulfonate.*—The xanthate compound from step II–A was dissolved in a mixture of 1 liter of 95% ethyl alcohol and 500 cc. of a 30% methylamine solution. After standing for 48 hours at room temperature, the reaction mixture was evaporated to dryness in vacuum. The dry residue was extracted with 500 cc. of a mixture of 30% ethyl alcohol and 70% ethylether to remove the ethylxanthamidate. The yield of product was 55 grams.

*Step IV.—β-Mercaptoethanesulfonic acid.*—The sodium β-mercaptoethanesulfonate from step III was dissolved in 500 cc. of water and processed through an Amberlite IR–120 ion exchange resin operating in its acid cycle. β-Mercaptoethanesulfonic acid was obtained as an aqueous solution.

*Step V.—Ammonium β-mercaptoethansulfonate.*—This compound was prepared by neutralizing the β-mercaptoethanesulfonic acid obtained from step IV with ammonium hydroxide.

*Example 2*

*Ammonium β-mercaptoethanesulfonate.*—The sodium β-mercaptoethanesulfonate of step III above may be converted directly to other acid salts such as ammonium β-mercaptoethanesulfonate as follows: 53 grams of sodium β-mercaptoethanesulfonate prepared in accordance with step III above was dissolved in 500 cc. of water and processed through an Amberlite IR–120 ion exchange resin. The effluent was collected directly in ammonium hydroxide and concentrated in vacuo. Ammonium β-mercaptoethanesulfonate was obtained in the form of finely divided white crystals and these were recrystallized by dissolving them in alcohol and precipitating with ethyl ether. In this manner, there was obtained 38 grams of material having a purity of 96%, based on SH titration, M. P. 158.5–163.5° C. The remaining 4% was presumably disulfide.

The foregoing xanthate process produces mercaptoalkanesulfonic acids in pure odorless form. The process is extremely desirable, therefore, since no known prior art process produces odorless compounds as does the process of the present invention.

It will be obvious to those skilled in the art that many modifications may be made within the scope of the present invention without departing from the spirit thereof, and the present invention is to be restricted only in accordance with the appended claims.

I claim:

1. A process for the preparation of a mercaptoalkanesulfonate which comprises reacting a haloalkanesulfonate having from one to five carbon atoms in water with an alkylxanthate having from one to five carbon atoms in water with an alkylxanthate having from one to five carbon atoms to form an alkylxanthogenatoalkanesulfonate, and reacting said latter compound with a base selected from the group consisting of ammonium hydroxide and organic nitrogen bases to form a mercaptoalkanesulfonate.

2. A process for the preparation of a β-mercaptoethanesulfonate which comprises reacting a haloethanesulfonate in water with an alkali metal alkylxanthate having from one to five carbon atoms to form an alkyl β-xanthogenatoethanesulfonate, and reacting said latter compound with a base selected from the group consisting of ammonium hydroxide and organic nitrogen bases to form a β-mercaptoethanesulfonate.

3. A process for the preparation of a β-mercaptoethanesulfonate which comprises reacting a β-chloroethanesulfonate in water with an alkali metal ethyl xanthate to form an ethyl β-xanthogenatoethanesulfonate, and reacting the latter compound with a base selected from the group consisting of ammonium hydroxide and organic nitrogen bases to form a β-mercaptoethanesulfonate.

4. A process for the preparation of a β-mercaptoethanesulfonate which comprises reacting a β-bromoethanesulfonate in water with an alkali metal butylxanthate, to form a butyl β-xanthogenatoethanesulfonate, and reacting the latter compound with a base selected from the group consisting of ammonium hydroxide and organic nitrogen bases to form a β-mercaptoethanesulfonate.

5. Compounds having the structure:

$$R_1OCSSRSO_3Me$$

in which R is an alkylene group having 1 to 5 carbon atoms; $R_1$ is an alkyl group having 1 to 5 carbon atoms; and Me is an alkali metal.

6. A compound having the structure:

$$R_1OCSSCH_2CH_2SO_3Me$$

in which $R_1$ is an alkyl group having 1 to 5 carbon atoms; and Me is an alkali metal.

7. A compound having the structure:

$$CH_3CH_2OCSSCH_2CH_2SO_3Na$$

8. A compound having the structure:

$$C_4H_9OCSSCH_2CH_2SO_3Na$$

References Cited in the file of this patent

UNITED STATES PATENTS

| Number | Name | Date |
|---|---|---|
| 1,888,794 | Ernst et al. | Nov. 22, 1932 |

OTHER REFERENCES

Lumiere et al.: Chem. Abstracts, vol. 29, page 5990 (1935).

Lipovich: Chem. Abstracts, vol. 40, p. 6047 (1946).